(12) United States Patent
Nandakumaraiah

(10) Patent No.: US 7,827,537 B2
(45) Date of Patent: Nov. 2, 2010

(54) SEARCHING COMPUTER PROGRAMS THAT USE DIFFERENT SEMANTICS

(75) Inventor: Chandan Bellur Nandakumaraiah, Sunnyvale, CA (US)

(73) Assignee: Oracle America, Inc, Redwood City, CA (US)

( * ) Notice: Subject to any disclaimer, the term of this patent is extended or adjusted under 35 U.S.C. 154(b) by 1195 days.

(21) Appl. No.: 11/441,620

(22) Filed: May 26, 2006

(65) Prior Publication Data

US 2007/0277164 A1 Nov. 29, 2007

(51) Int. Cl.
G06F 9/44 (2006.01)
G06F 9/45 (2006.01)
(52) U.S. Cl. .................. 717/127; 717/126; 717/140
(58) Field of Classification Search ......... 717/126–133, 717/140–143
See application file for complete search history.

(56) References Cited

U.S. PATENT DOCUMENTS

| | | | | |
|---|---|---|---|---|
| 4,905,138 | A * | 2/1990 | Bourne ...................... | 717/139 |
| 4,989,132 | A * | 1/1991 | Mellender et al. .......... | 717/139 |
| 5,734,907 | A * | 3/1998 | Jarossay et al. ............ | 717/141 |
| 5,819,093 | A * | 10/1998 | Davidson et al. ........... | 717/126 |
| 5,875,334 | A * | 2/1999 | Chow et al. ................ | 717/141 |
| 5,933,642 | A * | 8/1999 | Greenbaum et al. ........ | 717/140 |
| 5,956,479 | A * | 9/1999 | McInerney et al. ......... | 714/38 |
| 6,029,002 | A * | 2/2000 | Afifi et al. .................. | 717/131 |
| 6,070,007 | A * | 5/2000 | Simonyi ..................... | 717/106 |
| 6,085,029 | A * | 7/2000 | Kolawa et al. .............. | 714/38 |
| 6,202,202 | B1 * | 3/2001 | Steensgaard ................ | 717/127 |
| 6,467,082 | B1 * | 10/2002 | D'Arcy et al. .............. | 717/127 |
| 6,553,565 | B2 * | 4/2003 | Click et al. ................. | 717/129 |
| 6,687,899 | B1 * | 2/2004 | Shann ........................ | 717/162 |
| 6,817,010 | B2 * | 11/2004 | Aizenbud-Reshef et al. | 717/127 |
| 6,901,584 | B2 * | 5/2005 | Shann ........................ | 717/140 |
| 7,120,902 | B2 * | 10/2006 | Flanagan et al. ........... | 717/130 |
| 7,467,376 | B2 * | 12/2008 | Le Metayer et al. ........ | 717/143 |
| 7,526,755 | B2 * | 4/2009 | DeLine et al. .............. | 717/126 |
| 7,624,385 | B2 * | 11/2009 | Waddington et al. ....... | 717/143 |
| 7,661,096 | B2 * | 2/2010 | Meijer et al. ............... | 717/140 |

OTHER PUBLICATIONS

Bellekens et al, "Achieviing efficient access to large integrated sets of semantic data in web applications", IEEE, pp. 52-64, 2008.*

McIntyre et al, "Exploring content base image indexing techniques in the compressed doamin", IEEE, pp. 957-962, 2002.*

(Continued)

*Primary Examiner*—Anil Khatri
(74) *Attorney, Agent, or Firm*—Osha • Liang LLP

(57) ABSTRACT

A mechanism is disclosed for building and using an index for searching computer programs. The method involves building an index based on two or more computer programs that have a different set of semantics for defining symbols. More particularly, a determination is made as to whether a first symbol in a first program is being defined in the first program. The determination is based upon an understanding of a first set of semantics that the first program has for defining symbols. In response to a determination that the first symbol is being defined in the first program, the first symbol is added to a definition index, along with an indicator of the first program, to indicate that the first symbol is defined in the first program.

11 Claims, 5 Drawing Sheets

OTHER PUBLICATIONS

Karnstedt et al, "A DHT based infrastructure for Ad hoc integration and querying of semantic data", ACM IDEAS, pp. 19-28, 2008.*

Park et al, "Efficient storage and retrieval of probabilistic letent semantic information for information retrieval", The VLDB Journal, pp. 141-155, 2009.*

Bhattacharya et al, "MIST: distributed indexing and quering in sensor network using statistical models", ACM VLDB, pp. 854-865, 2007.*

Hu et al, "Indexing ontologies with semantics enhanced keywords", ACM K-CAP, pp. 119-126, 2007.*

Cscope, "CSCOPE", Tutorial, Updated Sep. 8, 2003 (15.5 Released), SourceForge Project Page, retrieved from the Internet: http://cscope.sourceforge.net, retrieved on May 30, 2006, 4 pgs.

Cscope, "The Vim/Cscope tutorial", SourceForge.net, Tutorial, retrieved from the internet: http://cscope.sourceforge.net/cscope_vim_tutorial.html , retrieved on May 30, 2006, 4 pgs.

Cscope, "CSCOPE", Tutorial, retrieved from the internet: http://cscope.sourceforge.net/csope_man_page.html , retrieved on May 30, 2006, 7 pgs.

Cscope, "Using Cscope on large projects (example: the Linux kernel)", SourceForge.net, Tutorial, retrieved from the internet: http://cscope.sourceforge.net/large_projects.html , retrieved on May 30, 2006, 3 pgs.

* cited by examiner

| 300 | |
|---|---|
| TEXT | |
| SYMBOL DEFINITION | FOO |
| SYMBOL REFERENCE | |
| FILE PATH | |
| REVISION HISTORY | |
| | SEARCH |

*Fig. 3*

SEARCHING COMPUTER PROGRAMS THAT USE DIFFERENT SEMANTICS

BACKGROUND

Search engines are computer software programs that allow users to search for files (e.g., web pages, documents, etc.). Search engines commonly search the world wide web, although search engines are applicable to other domains. Typically, a search engine works by sending out a spider to fetch files. Another program, called an indexer, then reads these files and creates an index based on key words contained in each file. The index thus contains a list of keywords, each of which identifies a file.

A search engine responds to a search query by producing a result set, which may contain thousands or even millions of files. Search engines rank the relevance of files in the result set, such that files that are expected to be the most relevant to the user's search query are presented to the user first. Search engines may be quite effective at returning meaningful results when the files are web pages. However, a drawback with typical search engines is that they are not effective for searching for information within computer programs.

A reason why search engines are not effective at searching for computer programs is that the terms in computer programs have a special meaning depending upon how they are used in the program. For example, each computer language has a set of semantics that defines how symbols are defined in the language. As a particular example, for the semantics of first computer programming language, an integer variable is defined in a program by using the reserved term "INT" followed by a user chosen symbol for the integer. To define an integer, the semantics of another program may require the reserved term "INTEGER" followed by the user chosen symbol for the integer.

Because a typical search engine does not understand the semantic meaning of symbol definitions in the computer program, the search engine cannot effectively search through computer programs. For example, a typical search engine cannot effectively search for occurrences of where a given symbol is defined in a group of computer programs. Because typical search engines look for keywords, the search results are likely to be over-inclusive in that the search results contain occurrences of the symbol other than where the symbol is being defined in the program. Moreover, a typical search engine would not rank the results properly. Search engines also fail to return meaningful results when the search criteria are based on something other than symbol definitions. For example, typical search engines do not understand when a symbol is being referenced in a program.

Because of these and potentially other drawbacks, this approach does not provide wholly satisfactory results. Consequently, an improved method and system for searching for computer programs is desired.

SUMMARY

In accordance with one embodiment of the present invention, there is provided a method of building and using an index for searching computer programs. The method involves building an index based on two or more programs that have a different set of semantics for defining symbols. For example, a first program may define a function call by a user-provided symbol followed by brackets, which may contain function parameters. The symbol is the name by which the function is referenced within the particular program. A second program may define a function call by the word "function" followed by a user-provided symbol and possibly one or more parameters. Thus, in this example, the semantics for defining functions are different, wherein the symbols are defined differently. The symbol definitions include other programming constructs, such as variable declarations.

More particularly, an embodiment of the present invention comprises the following. A determination is made as to whether a first symbol in a first program is being defined in the first program. This determination is made based upon an understanding of a first set of semantics that the first program has for defining symbols. In response to a determination that the first symbol is being defined in the first program, the first symbol is added to a definition index, along with an indicator of the first program, to indicate that the first symbol is defined in the first program.

A determination is made as to whether a second symbol in a second program is being defined in the second program. This determination is made based upon an understanding of a second set of semantics that the second program has for defining symbols. The second set of semantics is different from the first set of semantics. In response to a determination that the second symbol is being defined in the second program, the second symbol is added to the definition index, along with an indicator of the second program, to indicate that the second symbol is defined in the second program. The definition index is used to respond to a search request for finding a particular program in which a particular symbol is defined.

In one embodiment, the first set of semantics is further used for finding references to the symbols in the first program, and the second set of semantics is further used for finding references to the symbols in the second program. An example of a reference to a symbol is a function call or a use of a variable in a program. In this embodiment, the following is performed. A determination is made as to whether the first symbol is being referenced in the first program. This determination is made based upon an understanding of a first set of semantics. In response to a determination that the first symbol is being referenced in the first program, the reference to the first symbol is added to a reference index, along with an indicator of the first program, to indicate that the first symbol is referenced in the first program.

A determination is made as to whether the second symbol is being referenced in the second program. This determination is made based upon an understanding of a second set of semantics. In response to a determination that the second symbol is being referenced in the second program, the reference to the second symbol is added to the reference index, along with an indicator of the second program, to indicate that the second symbol is referenced in the second program. The reference index is used to respond to a search request for finding a particular program in which a particular symbol is referenced.

An interface for searching through computer programs that use different semantics is provided for, in an embodiment of the present invention. For example, computer programs having a given symbol definition and/or references to the symbol can be searched for based on search criteria entered in the interface. The interface also allows searching for computer programs based on revision history information, in one embodiment of the present invention. The interface also allows searching for computer programs based on human readable text, in one embodiment of the present invention. The interface further allows searching for computer programs based on program path information, in one embodiment of the present invention.

Notice that the same interface can be used to search different computer programs that use different semantics for defining symbols and/or referencing the symbols. Moreover, a user may use the same terminology when searching for computer programs that use different semantics for defining and referencing symbols. Thus, the specifics of the semantics are hidden from the user.

BRIEF DESCRIPTION OF THE DRAWINGS

FIG. 3 is a diagram illustrating an interface for searching for computer programs, in accordance with an embodiment of the present invention.

DETAILED DESCRIPTION OF
EMBODIMENT(S)

System Overview

Figure 1:
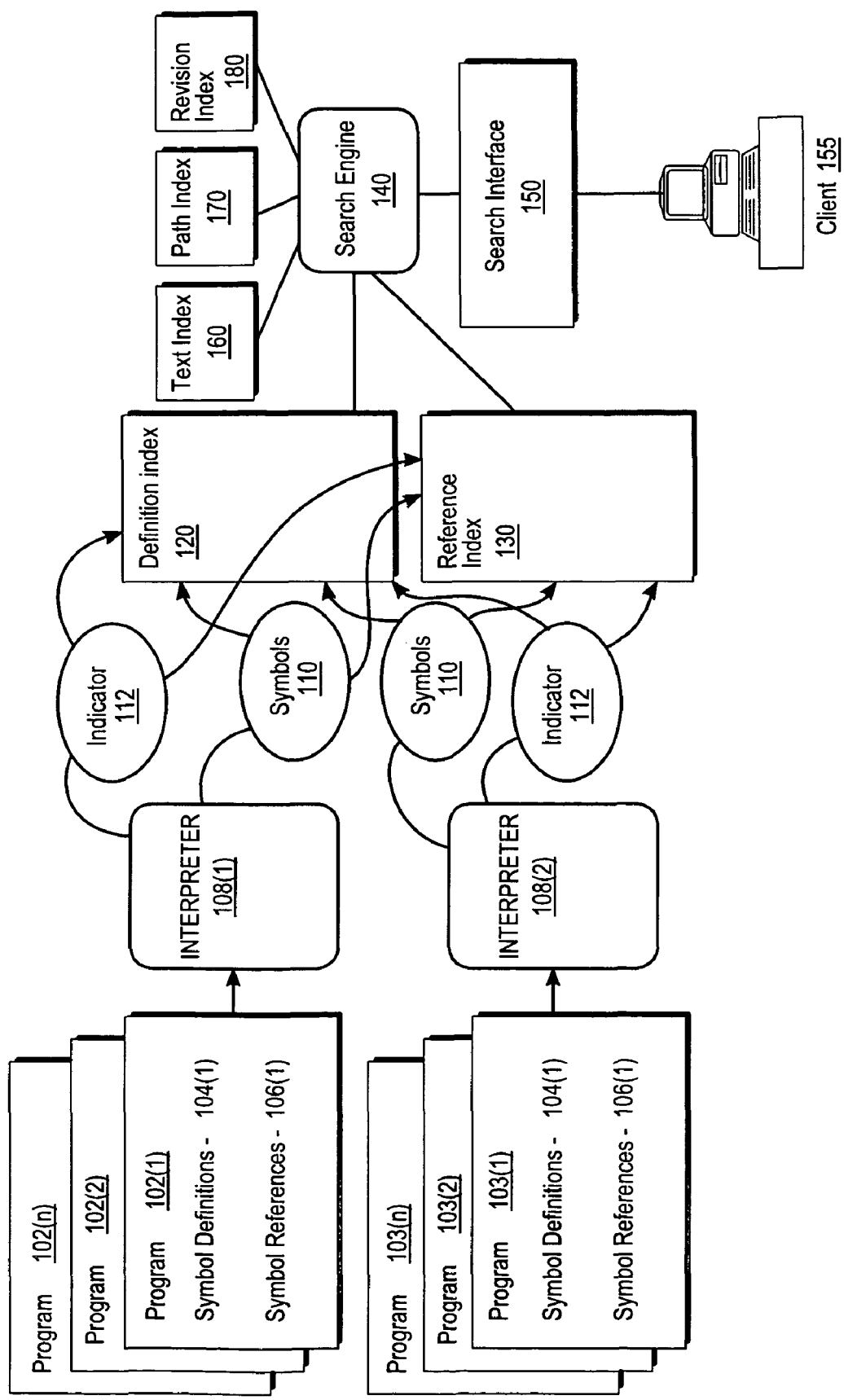
FIG. 1 is a system for creating and using an index for searching computer programs, in accordance with an embodiment of the present invention.

With reference to FIG. 1, computer programs 102(1-n) and computer programs 103(1-n) have symbol definitions 104 and symbol references 106. Examples of symbol definitions are variable, function, method, and macro definitions. Examples of symbol references are calls to a function or method, or the use of a variable. Programs 102(1-n) and programs 103(1-n) use a different set of semantics for how symbols are defined and referenced. For example, programs 102(1-n) and programs 103(1-n) may be written in different programming languages. The computer programs 102(1-n), 103(1-n) may be source code or executable code. As a particular example of the different semantics, if programs 102(1-n) are written in a version of the FORTRAN programming language a function call may be defined by the word "FUNCTION" followed by the name of the function and one or more parameters in brackets, as follows.

FUNCTION FOO [parameters]

If programs 103(1-n) are written in a version of the C programming language, a function call may be defined with a different set of semantics. For example, a function call for a function FOO may be defined as follows:

FOO (parameters)

Each interpreter 108(1), 108(2) understands the set of semantics for its respective computer programs. For example, interpreter 108(1) is able to locate symbol definitions in programs 102(1-n). The symbols associated with the definitions are added to the definition index 120, along with an indicator 112 (e.g., pointer) that indicates the program in which the symbol is defined. More particularly, the indicator 112 may indicate how to locate an excerpt of the program 102(1) where the symbol is defined.

Each interpreter 108(1), 108(2) is also able to understand the semantics of how symbols are referenced in its respective programs 102(1-n), 103(1-n) in this embodiment. The understanding of symbol references may be based on the understanding of the symbol definitions. For example, the reference index 130 may be constructed by first determining what symbols are being defined in the programs 102(1-n) and programs 103(1-n). Then, one or more of computer programs 102(1-n), 103(1-n) can be searched for occurrences of the symbols. The symbol occurrences might include both symbol definitions 104 and symbol references 106. In this case, the reference index 130 is a superset that contains both symbol definitions and symbol references. A search request for only symbol references can be satisfied by forming a preliminary results set by searching the reference index 130 for programs having the desired symbol and negating the preliminary results set with results formed by searching the definition index 120.

An interpreter 108 can be implemented, at least in part, with a program commonly referred to as "Ctags," which has a number of available implementations. The Ctags program can generate a file of objects found in source and header files of various programming languages. For example, the Ctags program can generate a file of symbol definitions.

FIG. 1 depicts the interpreters 108(1), 108(2) as generating the definition index 120 and reference index 130. However, the interpreters 108 might be used to generate other indexes. For example, the interpreters 108(1), 108(2) may be used to generate a text index 160, path index 170, and revision index 180, which will be discussed in greater detail herein. Generation of the other indexes 160, 170, 180 may depend upon the semantics of the programming languages; however, that is not required. Moreover, at least indexes 160, 170, 180 may be generated based, at least in part, on information that is external to the computer programs. For example, the revision index 180 might be generated based on information from a version control system.

The text index 160 is for searching for a program based on human readable text in the program. The human readable text may be comments or the like. However, the human readable text is not so limited. When a computer program is executable code, it may be necessary to understand the semantics of the language to properly determine what portions of the executable file represent human readable text.

The path index 170 is for searching for a program based on the hierarchical path to the program in, for example, a directory. Typically, an understanding of the semantics of a programming language is not necessary to determine the information for the path index. The path index information can typically be determined from information in the program. However, the path index can be generated based on information outside of a computer program.

The revision index 180 is for searching for a computer program based on revision history information. For example, the computer program may have a number of versions, which may be maintained by a versioning control tool. There are several available version control tools. For example, CVS (Concurrent Versions System) and RCS (Open source Revision Control System) are version control tools that are readily available. A version control tool may store different versions of a program in a file. The version control tool can interpret information in the file to obtain revision information.

The search interface 150 is accessible to a client 155 to allow searching for computer programs that use different semantics to define symbols. Further, the client 155 can enter a search query that is independent of the underlying semantics of any computer programming language. An example search interface is depicted in FIG. 3.

Referring again to FIG. 1, the search engine 140 responds to a search query by accessing one or more of the indexes (120, 130, 160, 170, 180).

Selective Retention of Semantic Meaning

The indexes are independent of detailed semantics of the underlying program, in one embodiment. In other words, the information is stored in the indexes in a way that is suitable for a wide variety of programming languages that use different semantics. As an example, assume that a given symbol is defined in program 102(1) as a function in accordance with the semantics of that language. The definition index 120 does not include information indicating the semantics that were used to define the symbol. Rather, the definition index 120 retains just the semantic meaning that the symbol is being defined in the program 102(1). Thus, the detailed semantics of the underlying program 102(1) are stripped away. Moreover, in one embodiment, the fact that the symbol defines a function, as opposed to a variable, macro, etc. is also stripped away. Thus, the definition index 120 is suitable for use for programming languages that do not allow functions to be defined, as well as those that do.

Thus, prior to extracting information from a program, the information may be programming language specific and may have detailed semantic meaning. After extracting the information and storing it in an index, it is no longer programming language specific. Moreover, detailed semantic meaning such as whether the symbol defines a function, macro, method, variable, etc. may be stripped away. However, the information in the index retains at least some of the semantic meaning. For example, storing the symbol in the definition index indicates that it is a symbol definition, although the information that the symbol is associated with a function may be lost. This selective retention of semantic meaning allows the indexes to be searched for computer programs in programming languages that use different semantics.

Process for Building Index

Figure 2:
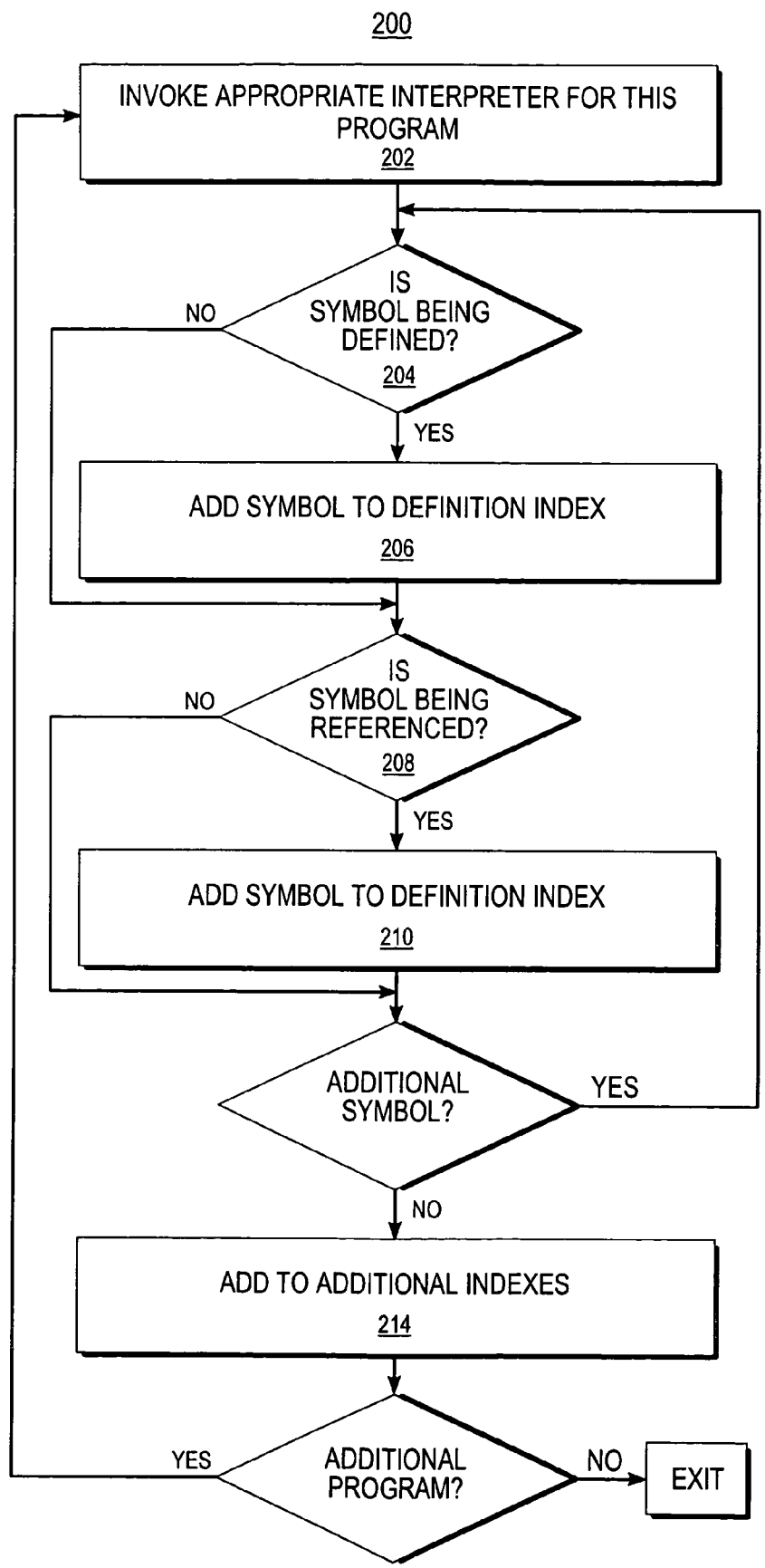
FIG. 2 is a flowchart illustrating steps of a process of creating an index for searching computer programs, in accordance with an embodiment of the present invention.

FIG. 2 illustrates a process 200 of building an index for searching through computer programs, in accordance with an embodiment of the present invention. Step 202 is invoking an appropriate interpreter that understands the semantics of a program. An appropriate interpreter may be determined based on many factors. For example, the file name can be examined to determine an appropriate interpreter. As a particular example, if the file name ends with .c or .h, then a C interpreter is chosen. The interpreter can also be determined based on content of the file. For example, if initial content of the file has the hexadecimal pattern "0xcafebabe", then interpreter for JAVA™ Class files is chosen (JAVA is a registered trademark of Sun Microsystems, Inc., located in Palo Alto, Calif. USA). The semantics define how symbols are defined in the program. The semantics also, at least implicitly, define how symbols are referenced. The semantics may also define how other information is interpreted. For example, the semantics may define how information in an executable file is interpreted. For example, the executable file may have information that represents human readable text.

Step 204 is determining if a symbol is being defined in the program. For example, an interpreter searches for occurrences of symbol definitions. As particular examples, the interpreter looks for variable definitions, function definitions, method definitions, etc. The semantics of the definitions are particular to the program. Thus, prior to extracting symbol from the program, the context in which the symbol is used is programming language specific.

Step 206 is adding the symbol to a definition index, which occurs in response to the determination in step 204. For example, if the interpreter determines that the variable "FOO" is being defined in the program, then the variable FOO is added to the definition index. After storing the symbol in the definition index, detailed semantic meaning such as whether the symbol defines a function, macro, method, variable, etc. is no longer available. However, the symbol retains at least some of the semantic meaning. For example, storing the symbol in the definition index indicates that it is a symbol definition, although the fact that the symbol is a variable definition may be lost. This selective retention of semantic meaning allows the indexes to be efficiently searched for programs written in languages that use different semantics.

An indicator is also added to the definition index such that the index can be used to locate the program in response to a search for the symbol definition. For example, the indicator points to the program in which the variable FOO is defined. The indicator may also point to the specific location in the program such that an excerpt of the program can be provided in the search results.

Step 208 is determining if the symbol is being referenced in the program. For example, if the symbol FOO is being referenced in the program, then control passes to step 210. In step 210, the symbol is added to a reference index. An indicator to the program is also added to the index. For example, the symbol FOO is added to the index, along with an indicator to the program where FOO is referenced. The indicator may point to a specific location in the program.

If there are more symbols in the program to interpret, then control passes to step 204 to determine if another symbol is being defined in the program. Process 200 continues until there are no more symbols to analyze.

In step 214, information is added to additional indexes. Those additional indexes may include a path index, a text index, and a revision history index. These additional indexes may be generated based on the semantics of the computer program. However, generating the other indexes may be based on information other than semantics, such as revision history information.

Control passes to step 202 to repeat steps 202-214, if there is another computer program for which symbols should be added to the definition and reference indexes. In step 202, the semantics for the next computer program are accessed. The process continues to repeat until there are no more programs to analyze. The semantics for at least two of the computer programs are different from each other. However, the same indexes are used for searches involving the computer programs that use different semantics. A single search interface can be used to conduct a search through computer programs, wherein different fields in the search interface correspond to the different indexes. However, for each field, the semantics of the computer programs being searched for are hidden from the user.

Example Interface

FIG. 3 is an example interface 300 for searching for computer programs in accordance with an embodiment of the present invention. The interface has a number of fields for which the user can enter a search request. The interface 300 allows the user to enter search criteria in one or more fields. For example, the user might search for programs with a particular revision history and having a particular symbol definition.

The symbol definition field allows the user to search for the definition of a symbol in a program. For example, if the user searches for the symbol definition "FOO", the definition index is used to locate programs in which the symbol FOO is defined.

The symbol reference field allows the user to search for references to a symbol. For example, if the user enters a search request in the symbol reference field for "FOO", then the reference index is used to find programs that reference the symbol FOO.

The path field allows the user to search for path information. The path index is used to search for files that satisfy the search criteria specified in the path field, in accordance with one embodiment. The revision history field allows the user to search for comments made over program revision changes. The revision history index is used to search for files that satisfy the search criteria specified in the revision history field, in accordance with one embodiment. The text field allows the user to search for text information. The text index is used to search for files that satisfy the search criteria specified in the text field, in accordance with one embodiment.

The search interface is not limited to any particular rules for specifying the search criteria and interpreting the search criteria. The search interface supports techniques such as requiring that a given term in the search criteria be present, requiring that a given term not be present, allowing the user to enter a partially formed term, etc. The following are examples search queries.

To find where "setResourceMonitors" is defined, the user can enter "setResourceMonitors" in the symbol definition field. To find files that reference the symbol "sprintf" in the path "usr/src/cmd/cmd-inet/usr.sbin/", the user can enter "sprintf" in the symbol reference field and "usr/src/cmd-inet/usr.sbin/" in the path field. To find assignments to a variable "Assign", the user can enter "Assign" in the text field. To find Makefiles where pstack binary is being built, the user can enter "pstack" in the text field and "Makefile" in the path field.

Thus, the interface 300 allows the user to search through computer programs that use different semantics. The interface 300 hides, from the user, the underlying semantics of the computer programs. Moreover, the interface 300 allows searching based on indexes that remove some of the semantic details of the computer programs, while retaining sufficient semantic information to provide meaningful search results. Thus, the interface and indexes described herein provide for an effective way to search through computer programs that use different semantics.

Figure 4:
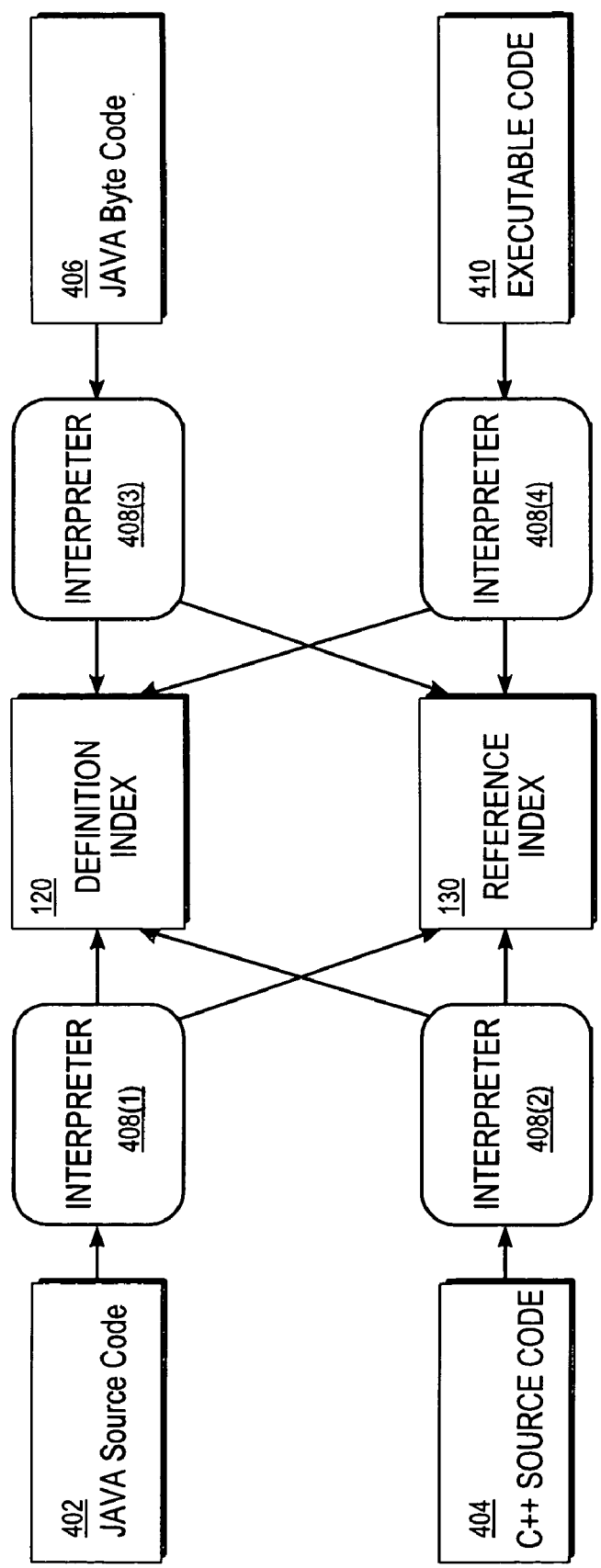
FIG. 4 is a system for creating indexes for searching different types of computer programs, in accordance with an embodiment of the present invention.

Example of System for Creating Indexes for Searching Different Types of Computer Programs FIG. 4 depicts a system for creating indexes for searching different types of computer programs, in accordance with an embodiment of the present invention. The different types of programs could be different languages or different formats (source code, executable code, etc.). The definition index 120 and the reference index 130 are similar to those in FIG. 1. In this case, the definition index 120 contains symbols associated with definitions in the JAVA™ program 402, the C++ program 404, the JAVA™ byte code 406, and the executable code 410. The executable code 410 may be executable code of any language. The JAVA™ program 402 and C++ program 404 are used as examples of different languages. Any other computer language could be used.

The interpreters 408(1)-408(4) understand the semantics of their respective programs and add appropriate symbols to the definition index 120 and the reference index 130.

HARDWARE OVERVIEW

Figure 5:
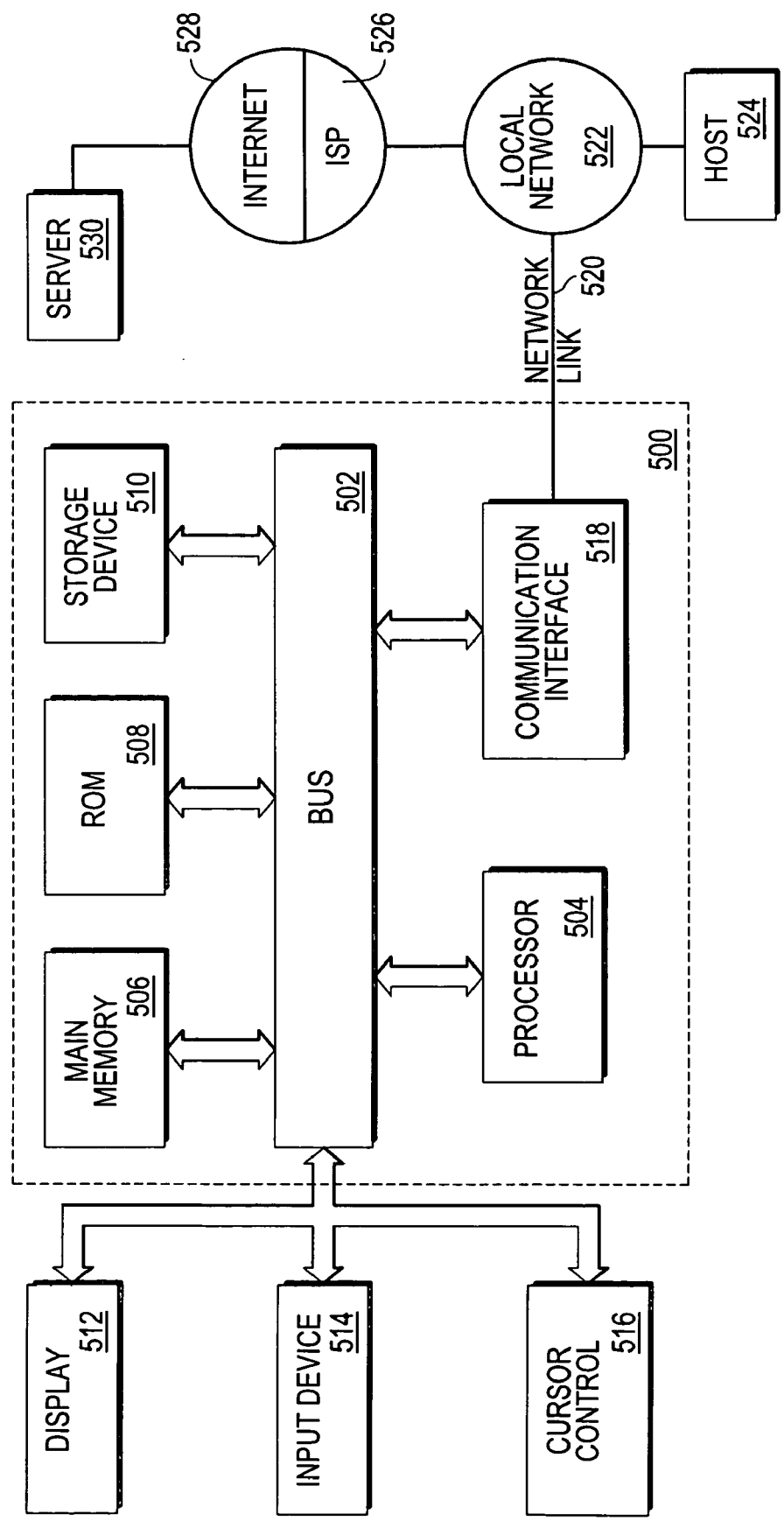
FIG. 5 is a diagram illustrating a computer system upon which an embodiment of the present invention may be practiced.

In one embodiment, steps of process 200 may take the form of sets of instructions that are executed by one or more processors. If they take the form of sets of instructions, FIG. 5 shows a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 505. Main memory 506 also may be used for storing temporary variables or other intermediate information during execution of instructions by processor 505. Computer system 500 may further include a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 505.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A tangible machine readable medium having stored thereon instructions which, when executed by one or more processors, causes the one or more processors to perform operations, comprising:
   receiving a search request for finding at least one program in which a symbol is defined;
   identifying, based on a definition index, a program in which the symbol is defined, wherein the identifying is based upon an understanding of a first set of semantics of a plurality of sets of semantics, wherein the first set of semantics is associated with the program; and
   in response to identifying the program, responding to the search request with the program,
   wherein identifying the program comprises analyzing executable code of the program,
   wherein the definition index comprises a plurality of entries,
   wherein each of the plurality of entries comprises a particular symbol and an indicator to a program in which the particular symbol is defined, and
   wherein each of the plurality of entries is associated with one of a plurality of programs and one of the plurality of sets of semantics.

2. The tangible machine readable medium of claim 1, having stored thereon additional instructions which, when executed by one or more processors, causes the one or more processors to perform additional operations, wherein the additional operations further comprise using a reference index to identify one of the plurality of programs in which the symbol is referenced.

3. The tangible machine readable medium of claim 1, having stored thereon additional instructions which, when executed by one or more processors, causes the one or more processors to perform additional operations, wherein the additional operations further comprise:

using a revision history index to identify one of the plurality of programs in which the symbol is referenced.

4. A tangible machine readable medium having stored thereon a set of instructions which, when executed by one or more processors, causes the one or more processors to perform the following operations:

determine whether a first symbol in a first program is being defined in the first program, wherein the determining is based upon an understanding of a first set of semantics that the first program has for defining symbols and based upon an analysis of executable code of the first program;

in response to a determination that the first symbol is being defined in the first program, add a first entry to a definition index to indicate that the first symbol is defined in the first program, wherein the first entry comprises the first symbol and an indicator to the first program;

determine whether a second symbol in a second program is being defined in the second program, wherein the determining is based upon an understanding of a second set of semantics that the second program has for defining symbols;

in response to a determination that the second symbol is being defined in the second program, add a second entry to the definition index to indicate that the second symbol is defined in the second program, wherein the second entry comprises the second symbol and an indicator to the second program;

receive a search request to find at least one program in which the first symbol is defined;

determine, based on the first entry of the definition index, that the first symbol is defined in the first program; and respond to the search request by identifying the first program as being at least one program in which the first symbol is defined, wherein the first set of semantics is different from the second set of semantics.

5. The tangible machine readable medium of claim 4, wherein the set of instructions further comprise instructions that when executed by the one or more processors, cause the one or more processors to perform the following operations:

determine whether a reference to the first symbol is included in the first program, based upon an understanding of the first set of semantics;

in response to a determination that the reference to the first symbol is included in the first program, add the reference to the first symbol and the indicator to the first program to a reference index to indicate that the first symbol is referenced in the first program;

determine whether a reference to the second symbol is included in the second program, based upon an understanding of the second set of semantics;

in response to a determination that the reference to the second symbol is included in the second program, add the reference to the second symbol and the indicator to the second program to the reference index to indicate that the second symbol is referenced in the second program.

6. The tangible machine readable medium of claim 4, wherein the set of instructions further comprise instructions that when executed by the one or more processors, cause the one or more processors to perform the following operation:

use a reference index to identify one of a plurality of programs in which the first symbol is referenced.

7. The tangible machine readable medium of claim 4, wherein the set of instructions further comprise instructions that when executed by the one or more processors, cause the one or more processors to perform the following operation:

use the definition index and a reference index to identify one of a plurality of programs in which the first symbol is defined and referenced.

8. The tangible machine readable medium of claim 4, wherein the set of instructions further comprise instructions that when executed by the one or more processors, cause the one or more processors to perform the following operation:

access a revision history of the first program;

based on the revision history of the first program, add revision history information of the first program and the indicator to the first program to a revision history index;

access a revision history of the second program;

based on the revision history of the second program, add revision history information of the second program and the indicator to the second program to the revision history index; and determine, based on the revision history index, that the first symbol is referenced in the first program.

9. The tangible machine readable medium of claim 4, wherein the first set of semantics is further for defining rules for expressing human readable text in the first program and the second set of semantics is further for defining rules for expressing human readable text in the second program, and wherein the set of instructions further comprise instructions that when executed by the one or more processors, cause the one or more processors to perform the following operations:

determine whether human readable text is being expressed in the first program, based upon an understanding of the first set of semantics;

in response to a determination that human readable text is being expressed in the first program, add the human readable text and the indicator to the first program to a human readable text index to indicate that the human readable text is expressed in the first program;

determine whether human readable text is being expressed in the second program, based upon an understanding of the second set of semantics;

in response to a determination that human readable text is being expressed in the second program, add the human readable text and the indicator to the second program to a human readable text index to indicate that the human readable text is expressed in the second program; and determine, based on the human readable text index, that the human readable text is expressed in the first program.

10. The tangible machine readable medium of claim 4, wherein the set of instructions further comprise instructions that when executed by the one or more processors, cause the one or more processors to perform the following operations:

access program path information for the first program;

based on the program path information, add a first program path of the first program to a program path index;

access program path information for the second program;

based on the program path information, add a second program path of the second program to the program path index; and determine, based on the program path index, that the first program has the first program path.

11. The tangible machine readable medium of claim 4, wherein the set of instructions further comprise instructions that when executed by one or more processors, causes the one or more processors to perform the following operation:

analyze source code of the first program.

\* \* \* \* \*